Jan. 29, 1935. A. S. FITZ GERALD 1,989,509
CARRIER CURRENT SELECTOR SYSTEM
Original Filed Jan. 24, 1928
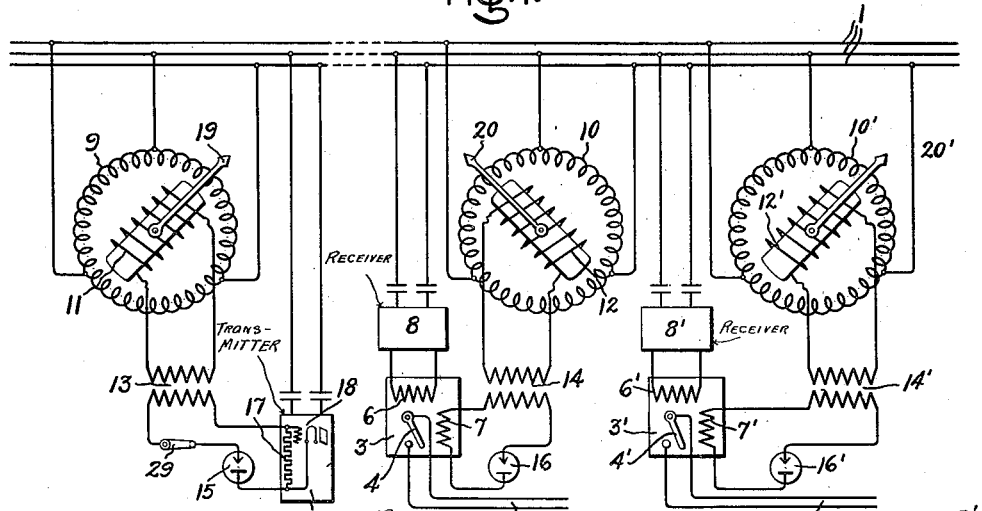
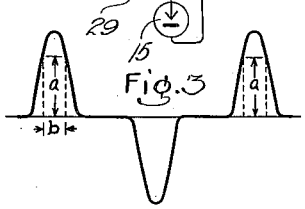
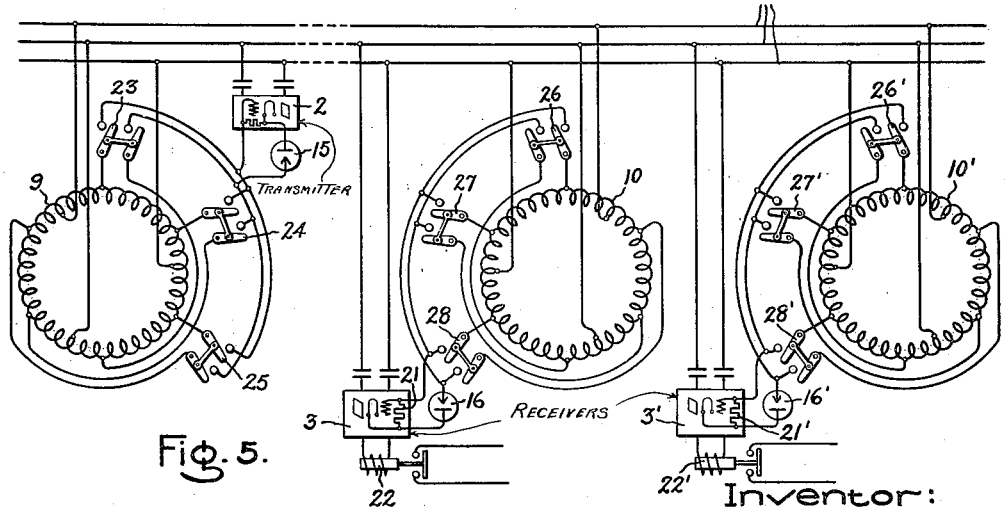
Inventor:
Alan S. FitzGerald,
by Charles E. Tullar
His Attorney.

Patented Jan. 29, 1935

1,989,509

UNITED STATES PATENT OFFICE 1,989,509

CARRIER CURRENT SELECTOR SYSTEM

Alan S. Fitz Gerald, Schenectady, N. Y., assignor to General Electric Company, a corporation of New York Application January 24, 1928, Serial No. 249,180
Renewed March 6, 1934

11 Claims. (Cl. 177—352)

My invention relates to selective signal systems and more particularly to an efficient system for use where the number of signal devices which are to be selectively operated is not great and economy is an important factor in determining the type of equipment to be employed.

In accordance with my invention, a transmitting device and a plurality of receiving devices, which are adapted to respond to currents from the transmitting device to control desired signal apparatus, are each rendered periodically and synchronously operable. Means are provided whereby the time phase relation between the occurrence of the operable periods of each of the receiving devices and the transmitting device is adjustable and controllable from the station in which the transmitting device is located, and the time phase relation between the occurrence of the operable periods of a particular receiving device and the other receiving devices is controllable from the station in which the particular device is located. By adjusting each receiving device so that it is operable in different time phase relation with respect to the transmitter the desired operation of a selected device may be had by causing the transmitter to operate simultaneously with the operable periods of a selected receiver.

In carrying out my invention I provide in each of the stations a polyphase winding arranged on a suitable magnetic core in a manner similar to that of the stator winding of an induction motor. When these windings are energized from a common polyphase source, such as from a common power distribution system, each of these windings will produce a rotating field all of which will be in synchronism. A single phase winding is placed in induced relation with each of these rotating fields and is adapted to have impressed thereon a single phase potential. This potential will, of course, have a phase relation with respect to the power source which may be controllable by varying the space relation of the induced member with respect to the polyphase member, i. e., by rotating the induced member about the axis of the rotating field. By rendering the transmitting device and each of the receiving devices operable in response to currents from the transmitter only during a suitable portion of the cycle of the alternating current wave from an associated induced member arranged as described, it will be seen that these devices will be periodically and synchronously operable and the time phase relation between the occurrence of the operable periods of the different devices may be suitably controlled. Each of the receiving devices is provided with a pair of contacts which are arranged in a signal circuit to be controlled and the receiving device is such that these contacts are operated only when the receiving device is simultaneously supplied with current from the transmitter and from the associated induced member. Hence it will be seen that by suitably adjusting the phase relation between the voltage of the induced member associated with the transmitting device and that associated with each of the receiving devices the desired selective operation of a particular receiving device may be had.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing, in which Fig. 1 illustrates one form of my invention; Figs. 2, 3 and 4 represent operating characteristics thereof and Figs. 5, 6 and 7 represent modifications of the invention.

With reference to Fig. 1 of the drawing, 1 represents a source of polyphase alternating current which may comprise the lines of the usual polyphase power distribution system. 2 represents a transmitting device which may be of any suitable construction and which, as illustrated, comprises means for supplying carrier currents to the distribution system 1. These currents may be of high frequency or of any other characteristic which renders them readily separable from the currents of the power system. 3 and 3' represent receiving devices, each of which are provided with contacts 4 and 4' for controlling the signaling circuit 5, 5'. These receiving devices may comprise any suitable means which is operable to close the contacts 4 only when supplied with currents from a plurality of sources. In the form shown in Fig. 1 it comprises a relay having two coils 6 and 7, the former of which is adapted to be supplied with currents in response to the transmitting device 2 and the latter of which is adapted to be supplied with currents from the above mentioned associated induced member in a manner presently to be described. 8 and 8' represent receivers such as are commonly employed in carrier current systems and may comprise rectifying means for the carrier current wave, demodulating means where modulated carrier waves are employed, or which may comprise a simple tuning, or filtering, device whereby the carrier currents may be supplied directly to the coil 6 and 6' of the devices 3 and 3'. A receiver of a type which may be employed is shown in Patent No. 1,522,581 of Lloyd Espenschied.

9, 10 and 10' represent windings such as those of the usual stator winding of an induction motor. These windings are wound upon a closed iron core and are adapted to be supplied with polyphase currents from the distribution system 1. One of these windings, 9, is located at the transmitting station and the others, 10, 10', are located in stations at which signal devices are to be operated. Each of them is associated with a corresponding transmitting or receiving device in a manner presently to be described. Induced members 11, 12, 12' comprise single phase windings each of which is mounted upon a suitable magnetic core which is adapted for rotation about the axis of the windings 9, 10, 10', or, about the axis of rotation of the rotating field which is set up within the windings 9, 10, 10'. These windings are adapted, by means not shown, to be maintained stationary in any one of a plurality of positions, and consequently these windings have induced therein a single phase alternating current potential from the windings 9, 10, 10' having a phase relation with the source 1 which is dependent upon the position in which the induced member is maintained. Energy is supplied from each of these induced windings 11, 12, 12' through suitable transformers 13, 14, 14' and electron discharge devices 15, 16, 16' to the associated signal apparatus 2, 3, 3'. Each of the transformers 13, 14, 14' receives alternating current from the associated winding 11, 12, 12' such that they operate above the point of saturation. For this reason these transformers preferably have cores of metal, such as permalloy or other metal, having high permeability. Electron discharge devices 15, 16, 16' are of the usual glow tube construction and comprise vessels which are filled with suitable gas, such as neon or argon and in which are enclosed electrodes which are dissimilar, either as to shape or as to composition, such that a rectifying action is effected. For the purpose of illustration I have shown within the transmitting device 2 a resistance 17 connected in circuit with the secondary winding of the transformer 13 and the electron discharge device 15 and which is also connected between the grid and filament of the electron discharge device 18 which is employed in the transmitter. This transmitter may comprise an oscillation generator or amplifier or other suitable device, which is normally employed in carrier current transmitters and is adapted to be operable only when a certain potential is impressed upon the resistance 17, due to direct current flowing through the electron discharge device 15.

The idea of keying a transmitter by use of a discharge device, as indicated at 15, to produce abrupt response of the transmitter to variations of intensity of a supplied voltage is being claimed in my continuation application Serial No. 606,355 filed April 20, 1932 for Signal transmitters.

As thus arranged the operation of my device is as follows: When the windings 9, 10, 10' are supplied with polyphase currents from the distribution system 1 a rotating field will be set up within these windings with the result that single phase alternating currents having the form shown in Fig. 2 will be impressed upon the induced windings 11, 12, 12'. This alternating current will produce in the secondary windings of the saturated core transformers 13, 14, 14' potential having a wave shape such as that shown in Fig. 3. It is well known that electron discharge devices of the type described will pass current only when the potential applied thereto reaches a predetermined value, at which value these devices break down and a discharge current is caused freely to flow through the device. This breakdown voltage of the devices 15, 16, 16' is represented at a in Fig. 3. Since these devices are rectifying devices it will be seen that a direct current will flow therethrough and consequently through the resistance 17 at the transmitter, and the winding 7 and 7' of the receivers only in periodic pulsations, one pulsation occurring during each cycle of the alternating current waves which are impressed upon the induced members 11, 12, 12' and during the time when the potential on the induced windings is at substantially a maximum value. This current will be supplied to the resistance 17 and the winding 7, 7' through a time interval b (Figs. 3 and 4) of each cycle of the alternating current wave which is impressed upon the associated induced member of the respective devices 9, 11; 10, 12; 10', 12'. Accordingly the transmitting device 2 will supply currents to the receivers 3, 3' only during this short interval of the wave which is impressed on the winding 11 and the receivers are in condition to respond to this current during a corresponding portion of the wave which is impressed on members 12, 12'.

Any suitable indicating means, such as pointers 19, 20, 20', indicating the position which the induced members 11, 12, 12' occupy with respect to the stator windings 9, 10, 10' respectively may be employed. It will be seen that with the pointers 19 and 20' located in the position shown in the drawing that the winding 7' and the resistance 17 will be simultaneously energized during an interval b of each cycle of the alternating current wave, whereas the period of energization of the winding 7 will be displaced in time phase relation with that of the winding 7' and the resistance 17 by about 90 degrees, this relation being controllable by adjusting the position of the induced members 11, 12, 12' with respect to their associated windings 9, 10, 10' respectively. Since each of the windings 6, 6' are energized simultaneously with the resistance 17 by means of carrier currents which are transmitted over the distribution system 1, it will be seen that windings 6' and 7' of the receiving device 3' will be simultaneously energized, thereby closing the contacts 4', which in turn close the signal circuit 5' of any suitable device which is to be operated. The windings 6 and 7 of the receiver 3 will not be energized simultaneously and accordingly this device will not be operated.

If it be desired to operate the device 3 this may be accomplished by moving the pointer 19 to the left through substantially 90 degrees. This will cause the simultaneous energization of the windings 6 and 7 and the consequent closing of the contacts 4 for controlling the signal circuit. As thus arranged the receiving device 3' will not be operated.

It will be apparent from this description that where a number of receiving devices are to be operated selectively from a single transmitter the induced members of each of these devices will be adjusted at a different angle with respect to the position occupied by the induced member of the transmitter at any particular time. Then any receiver may be selectively operated by moving the pointer 19 of the transmitting device to the position corresponding to the position occupied by the pointer 20, 20' of the selected receiver. To prevent unintentional operation of a remote device while the induced member 11 is being moved from one position to another a switch 29 which is connected in series with the electron discharge device 15 may be opened during this operation.

In Fig. 5 I have shown my invention modified in certain details which I shall presently point out. The receivers 3 and 3' in this case may be of the type which is usually employed in connection with the reception of radio or carrier currents including electron discharge devices of the three-element type, such, for example, as that shown in the above mentioned patent. These devices may have a resistance 21, 21' connected between the grid and cathode thereof, this resistance being adapted to be supplied with direct current from electron discharge devices 16, 16', the arrangement being such that these receivers are operable to supply currents to the signal controlling relays 22 and 22' in response to carrier current which is received from the transmitter 2, only when direct current is supplied to the resistance 21, 21', thereby producing a proper operating bias potential upon the grid of the electron discharge device. While in Fig. 5 I have designated the devices 3 and 3' as receivers, it will be understood that these devices are signal devices within the meaning of that term as used in the appended claims.

The saturated core transformers are omitted, the alternating current sine wave being impressed directly upon the electron discharge device 16, 16'. This arrangement may effect an economy where only a very few devices are to be selectively operated but the selectivity will not be as great and the device will be more sensitive to voltage variations in the distribution system 1.

The circuits of the electron discharge devices 15, 16, 16' are adapted to be connected electrically to diametrically opposite points upon the associated windings 9, 10, 10' through suitable switches 23, 24, 25; 26, 27, 28; 26', 27', 28' respectively. Thus, for example, in case of the transmitter, if the switch 23 be closed alternating currents will be supplied to the circuit of the discharge device 15 having a certain phase relation with respect to the voltage of the distribution system. If this switch be opened and the switch 24 be closed alternating current will be supplied to the circuit of the discharge device 15 having a phase relation with respect to the distribution system which is about 60 degrees displaced with respect to that which was supplied through the switch 23, and similarly if the switch 25 be closed alternating currents will be supplied to the circuit of the discharge device 15 having a still different phase relation with respect to the distribution system. At each of the receiving stations a predetermined switch which is known to the operator at the transmitting station, will be maintained in closed position. Thus, for example, the switch 26 associated with the receiving device 3 will be maintained in its closed position and similarly switch 27' associated with the receiver 3' will be maintained in its closed position, and similarly a different switch for each of the different receivers. Then if the operator at the transmitting station desires to operate the signal control relay 22 he will close the switch 23 which impresses a potential upon the discharge device 15, having the same phase relation with respect to the distribution system as that which is impressed upon the discharge device 16, through the switch 26, thereby causing simultaneous energization of the receiver 3 with both carrier current and direct current from the discharge device 16. Similarly if the operator desires to operate the signal control relay 22' he will close the switch 25, thereby impressing upon the discharge device 15 a potential which has the same phase relation with respect to the distribution system 1 as the potential which is supplied to the electron discharge device 16' through the switch 27'. Accordingly the receiving device 3' will be simultaneously supplied with carrier currents from the distribution system 1 and with direct current from the rectifying device 16'. Similarly by closing the switch 24 the operator may control a still further signal control relay at a station not shown.

While I have shown my invention in connection with a carrier current system it will, of course, be understood that I do not wish to be limited thereto since in certain instances, as where lines are available, it may be desirable to supply direct current impulses directly from the discharge device 15 to the windings 6, 6', etc. This modification is shown in Fig. 6 in which the output from transformer 13 is shown as connected directly through discharge device 15 to the windings 6 and 6' of control devices 3 and 3'. Likewise while I have shown only one means by which a transmitting device 2 and receiving devices 3, 3', Fig. 2, may be rendered periodically operative during short intervals of time it will, of course, be understood that many means may be employed. For example alternating currents from a saturated core transformer, employed as described, may be supplied directly to the anode circuit of the electron discharge devices employed either in the transmitter or receiver. This modification is illustrated in Fig. 7 in which I have conventionally indicated the three elements of an electron discharge device employed in the transmitter 18. The secondary winding of saturated core transformer 13 is connected directly between the anode and cathode of device 18, the device 15 being omitted. Since these devices as ordinarily constructed are inherent rectifiers and are operable only when a predetermined potential is applied thereto it will be seen that they will be rendered periodically operative during intervals such as that indicated in Figs. 3 and 4. Thus the discharge devices 15 and 16 may be eliminated and their function performed by the devices normally employed in the transmitter and receiver.

It will further be seen that I have provided a system which, where the number of signal devices which are to be selectively operated are comparatively few, has very desirable structural and operative advantages. For example the system is completely electrical, there being no moving parts, mechanical selectors and the like, with the exception of a single relay contact at each receiver which is employed in the system, and in consequence the remote operation may be effected substantially instantaneously. The amount of apparatus employed is very small, thereby rendering the system of economical construction and at the same time providing an efficient selecting means.

While I have described particular embodiments of my invention it will, of course, be understood that I do not wish to be limited thereto since many additional modifications may be made both in the circuit arrangement and in the instrumentalities employed without departing from the spirit and scope of my invention as set forth in the appended claims.

What I claim as new and desire to secure by Letters Patent of the United States is:—

1. The combination in a selective signal system of a plurality of signal devices, a common means for periodically supplying currents to each of said signal devices, additional means for periodically supplying current to each of said signal devices synchronously with said common means and means for varying the time phase relation between the periodic supply of current from said common means and from said additional means to any of said signal devices whereby any selected signal device may be simultaneously energized with currents from said common means and from said additional means, each of said signal devices being responsive only to simultaneous energization from said common and additional means.

2. The combination, in a selective signal system of a plurality of signal devices, a common means for periodically supplying current to all of said devices, additional means for periodically supplying current to each of said devices synchronously with said common means and to different devices in different predetermined time phase relations with respect to said common means, and means for causing the supply of current from said common means and from said additional means to a selected signal device to be simultaneous, each of said signal devices being operable only responsively to current supplied simultaneously from said common and additional means.

3. In combination, a polyphase system of distribution, a control station and a plurality of remote stations, means including said polyphase system of distribution for producing a plurality of synchronously rotating magnetic fields, one of said fields being in each station, means arranged in induced relation with each of said fields to have a periodic voltage impressed thereon, a signal device associated with the induced member in each of said remote stations, means for periodically supplying current to all of said signal devices in predetermined time phase relation with the periodic voltage in the induced member in said control station, and means for periodically supplying current to each of said devices in said remote stations in predetermined time phase relation with potential in the induced member associated therewith, each of said signal devices being operable only responsively to simultaneous supply of current from each of said last two means, and means at the control station for varying the time phase relation between the supplies of current to each of said signal devices.

4. In combination, a source of polyphase alternating current, a plurality of means energized from said source for producing single phase potential, each of said means including means for varying the phase relation between said single phase potential and the potential of said source, a transmitting device associated with one of said means, a receiving device associated with each of the other of said means, means operable during a peak portion of the single phase wave to supply current from each of said means to the associated device, and means for supplying current from said transmitting device to each of said receiving devices, each of said receiving devices being operable only when supplied with current from the associated means and from said transmitting device, and signal means controlled by each of said receiving devices.

5. In a carrier current selective signal system, a polyphase distribution system, a carrier current transmitting device and a plurality of receiving devices, a signal device associated with each of said receiving devices, connections from said distribution system to each of said devices, each of said receiving devices being connected when energized to operate the associated signal device in response to currents from said transmitting device, means associated with each of said devices for periodically energizing said devices, each of said means including a means for producing a single phase potential bearing a definite phase relation with said polyphase system, means for adjusting said phase relation, and means for supplying energizing current to the associated device during a period of substantially maximum value of said single phase potential.

6. The combination in a system of the class described, a signal apparatus which is to be periodically energized, a source of polyphase currents, means connected to said source for producing a rotating field, a coil in induced relation with said field, a unilaterally conducting device, a saturated core transformer having a primary winding and a secondary winding, said primary winding being connected to said coil and said secondary winding being connected through said unilaterally conducting device to said apparatus.

7. The combination, in a system of the class described, a source of polyphase potential, a signal apparatus which is to be periodically energized in adjustable phase relation with said source, means for producing single phase potential from said polyphase potential, means for adjusting the phase relation of said single phase potential with respect to said polyphase potential, and a unilaterally conducting discharge device having a substantial breakdown potential which is less than the maximum value of said single phase potential, said device being connected in circuit between said single phase potential producing means and said signal apparatus.

8. In combination, a transmitting device, a plurality of receiving devices connected when energized to respond to currents from said transmitting device, means for periodically rendering said transmitting device operable and for periodically energizing each of said receiving devices synchronously with the operable periods of said transmitting devices, and means for controlling the time phase relation between the occurrence of the operable periods of said transmitting device and the energized periods of each of said receiving devices.

9. In combination, a transmitting station, a plurality of receiving stations, means whereby a low frequency wave is produced in each of said receiving stations, said wave having a different time phase relation in each station, and means at the transmitting station to apply a current pulse simultaneously to all of said receiving stations, and means in each receiving station responsive to said pulse only when it arrives at a predetermined time in the cycle of the low frequency wave in said station.

10. In combination, a transmitting station, a plurality of receiving stations, means whereby a low frequency wave is produced in each of said stations, said wave having a different time phase relation in each station, and means to transmit from said transmitting station to all of said receiving stations simultaneously a current pulse, and means in each receiving station to produce an indication dependent upon the time in the cycle of the low frequency wave in said station when said pulse is received.

11. In combination, a transmitting station, a plurality of receiving stations, means whereby a low frequency wave is produced in each of said receiving stations, said wave having a different time phase relation in each station, and means at the transmitting station to apply a current pulse simultaneously to all of said stations, and means in each receiving station selectively responsive to the time in the cycle of the low frequency wave in the respective station when said pulse occurs.

ALAN S. FITZ GERALD.